(12) United States Patent
Milojicic et al.

(10) Patent No.: US 10,387,335 B2
(45) Date of Patent: Aug. 20, 2019

(54) MEMORY SYSTEM AND HANDLES TO MASTER CAPABILITIES

(71) Applicant: Hewlett Packard Enterprise Development LP, Houston, TX (US)

(72) Inventors: Dejan S. Milojicic, Palo Alto, CA (US); Moritz Josef Hoffmann, Palo Alto, CA (US); Alexander Richardson, Palo Alto, CA (US); Qiong Cai, Palo Alto, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 139 days.

(21) Appl. No.: 15/718,214

(22) Filed: Sep. 28, 2017

(65) Prior Publication Data

US 2019/0095356 A1 Mar. 28, 2019

(51) Int. Cl.
| | | |
|---|---|---|
| *G06F 12/00* | (2006.01) | |
| *G06F 12/14* | (2006.01) | |
| *G06F 12/121* | (2016.01) | |
| *G06F 12/02* | (2006.01) | |

(52) U.S. Cl.
CPC ........ *G06F 12/1441* (2013.01); *G06F 12/023* (2013.01); *G06F 12/121* (2013.01); *G06F 2212/1052* (2013.01); *G06F 2212/621* (2013.01)

(58) Field of Classification Search
None
See application file for complete search history.

(56) References Cited

U.S. PATENT DOCUMENTS

| | | |
|---|---|---|
| 7,073,011 B2 | 7/2006 | Lisitsa et al. |
| 7,380,039 B2 | 5/2008 | Miloushev et al. |
| 7,668,908 B2 | 2/2010 | Kakivaya et al. |
| 8,966,213 B2 | 2/2015 | Erdmann et al. |
| 9,600,669 B2 | 3/2017 | Filman et al. |
| 2018/0285003 A1* | 10/2018 | Richardson ........... G06F 3/0622 |
| 2019/0012455 A1* | 1/2019 | Barnes .................... G06F 21/52 |
| 2019/0026236 A1* | 1/2019 | Barnes ................... G06F 21/125 |
| 2019/0034664 A1* | 1/2019 | Barnes ................... G06F 21/125 |

OTHER PUBLICATIONS

Matthias Daum et al., "Concerned with the unprivileged: user programs in kernel refinement", May 4, 2014, BCS Formal Aspects of Computing, pp. 1205-1229. (Year: 2014).*
Rebecca Isaacs, "Dynamic Provisioning of Resource-Assured and Programmable Virtual Private Networks," Dec. 2000, pp. 1-160, University of Cambridge.

* cited by examiner

*Primary Examiner* — John A Lane
(74) *Attorney, Agent, or Firm* — Hewlett Packard Enterprise Patent Department

(57) ABSTRACT

In one example, a processor sends a memory access request including a data capability and a handle which references a master capability. In response to receiving the memory access request, a memory controller checks whether the handle references a valid master capability and checks whether the data capability is within a scope of the master capability. In response to determining that the master capability is valid and the data capability is within the scope of the master capability, the memory controller returns a result of the memory access request to the processor.

20 Claims, 12 Drawing Sheets

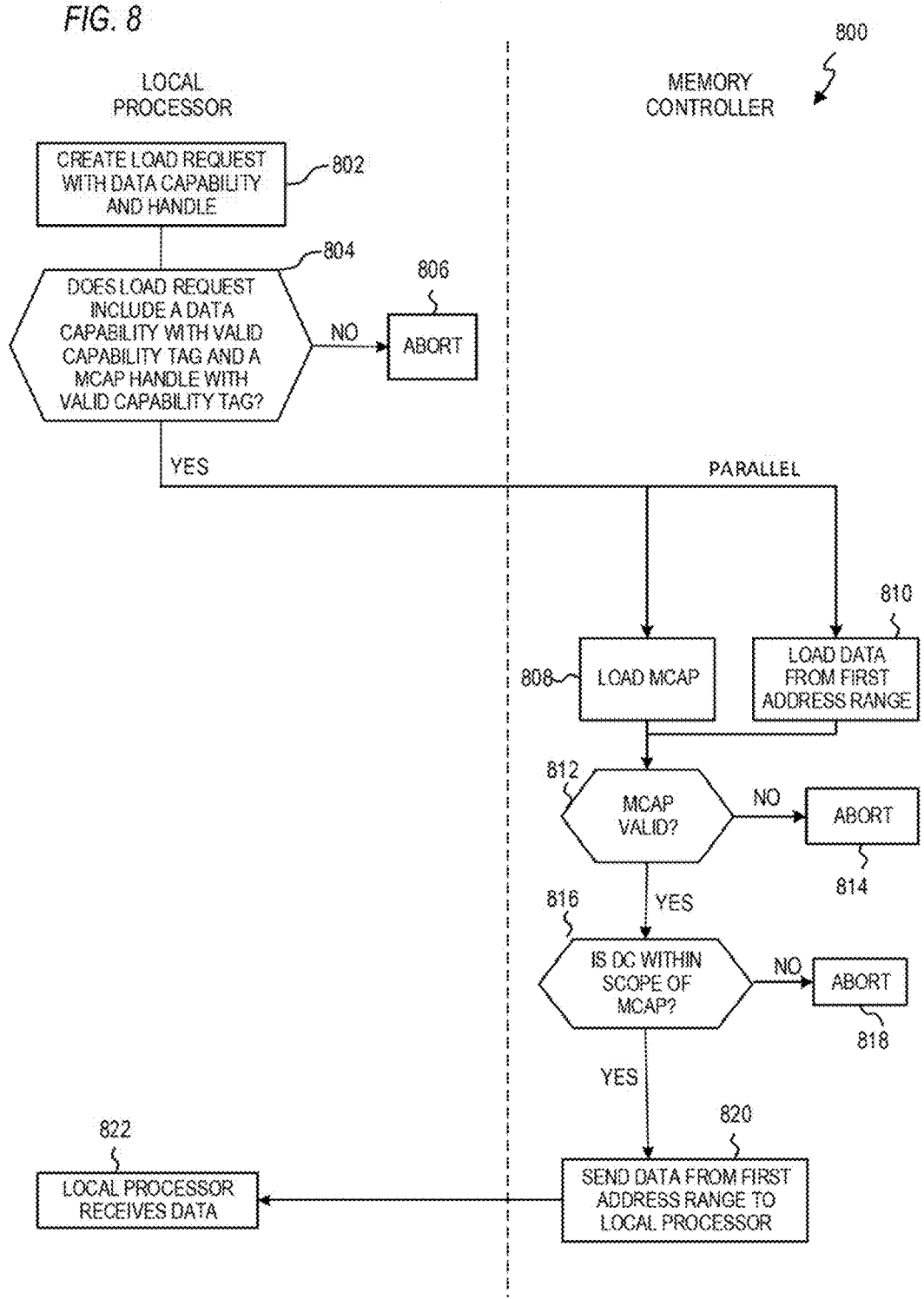

MEMORY SYSTEM AND HANDLES TO MASTER CAPABILITIES

BACKGROUND

A computer system and an operating system thereof may employ capabilities to represent, address and grant access to objects or resources, such as regions of memory. A capability is a token of authority that points to a range of memory addresses and includes a set of permissions indicating operations, such as read, write and execute etc., for which the capability grants permission. For example, a capability may include a base and a length which together define an area of memory and number of permission bits which indicate whether an operation corresponding to the permission bit is allowed or not.

When an area of memory is allocated to a process, a capability may be created by the operating system kernel. This original capability may cover a relatively large region of memory. Based on this original capability, a number of derived capabilities may be created, each derived capability pointing to a sub-set of memory addresses within the range of memory addresses governed by the original capability. The derived capabilities may be used to access particular pieces of data or for other purposes associated with the process. As a result, a process may create a large number of derived capabilities, which are based on an original capability.

When the memory resource is freed up for reallocation, the corresponding capabilities, both the original and derived ones, may be revoked and deleted. One approach is to keep some sort of linked list or chains of pointers to track all the derived capabilities so that they can be found and revoked. However, this makes revocation a costly and complex operation.

BRIEF DESCRIPTION OF THE DRAWINGS

Examples of the disclosure will now be described, by way of non-limiting examples, with reference to the accompanying drawings, in which:

FIG. 8 shows an example method of reading data from persistent memory.

DETAILED DESCRIPTION

Figure 1:
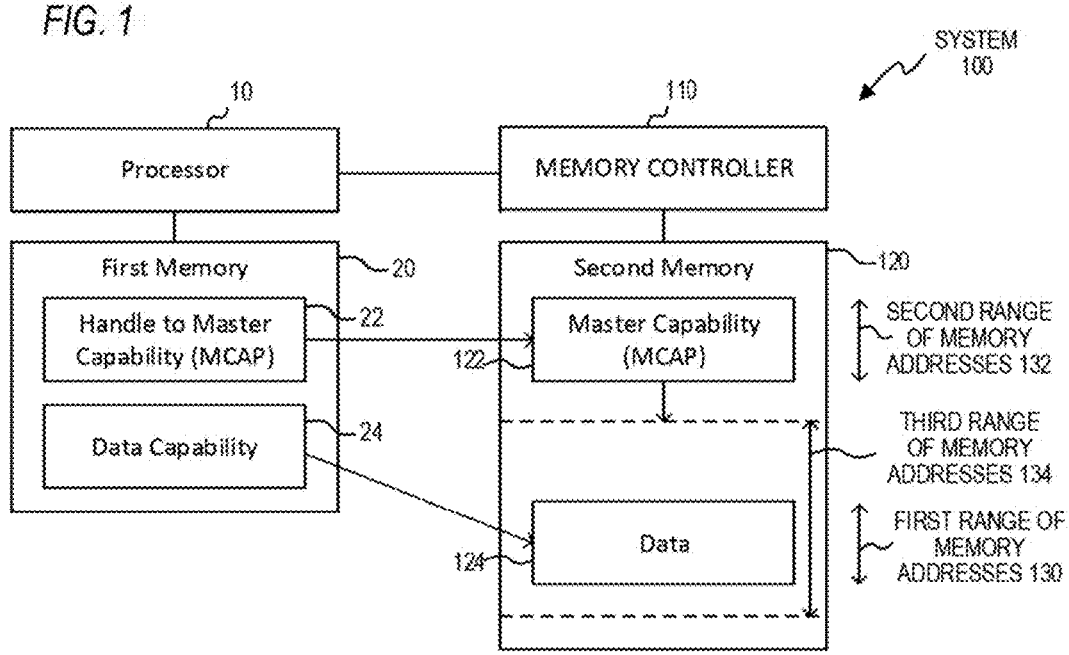
FIG. 1 is a schematic view of an example system according to the present disclosure.

According to one example of the present disclosure, there is provided a method of accessing persistent memory in a capability based memory system, in which a processor sends a memory access request to a memory controller of the persistent memory. The memory access request includes a data capability for a first range of memory addresses and a handle which references a master capability stored in a second range of memory addresses. In response to receiving the memory access request, the memory controller checks whether the handle references a valid master capability and checks whether the data capability is within a scope of the master capability. In response to determining that the master capability is valid and the data capability is within the scope of the master capability, the memory controller returns a result of the memory access request to the processor.

In this way, a master capability is checked whenever a data capability is used. Therefore, when memory is de-allocated, it is sufficient to revoke the master capability. When the memory controller is presented with a data capability linked to a revoked master capability, the memory controller may generate a 'capability invalid' exception. The node on which the data capability resides may revoke the data capability in response to this exception. This lazy approach, in which derived capabilities are revoked when they are used, avoids using a complex mechanism to track and revoke all of the derived data capabilities. Further, the impact on data retrieval time is low, as the data referenced by the data capability may be retrieved by the memory controller in parallel with checking the master capability.

Capabilities differ from pointers at least in that a capability includes at least one permission, whereas pointers do not include permissions. Further, whereas a pointer typically points to a single memory location, a capability points to a range of memory addresses. The range may be as small as the smallest addressable object in the persistent memory (e.g., a byte) or as large as the entire address space. Further, whereas a pointer is forgeable, a capability may be unforgeable. The memory, processor and instruction set architecture (ISA) of a computer system may be set up in such a way that a capability is unforgeable. For example, a system may be configured such that creation of a new capability and modification of an existing capability can only be done through a privileged set of instructions. The privileged set of instructions may be restricted to a secure part of the operating system kernel and not directly available to normal application programs. A capability may be associated with a capability bit which may be stored in a register or a part of memory that is not visible to the user. The capability bit may be written by the secure part of the operating system kernel when copying or modifying a capability. If a capability bit is not present then the capability may be determined to be invalid. Thus, a capability which is illegally copied or forged can be detected as the capability bit will not be present.

Capabilities can be copied and passed to other processes or other abstractions (threads, objects, etc.). A capability may also be modified in a way which reduces the scope of rights which it confers (e.g. reducing the address range or reducing the number of permissions). The instruction set architecture (ISA) may stipulate that a capability may be modified to reduce, but not increase, the scope of rights which are granted.

For simplicity and illustrative purposes, the present disclosure is described by referring mainly to examples thereof. As used herein, the terms "includes" means includes but not limited to, the term "including" means including but not limited to. The term "comprises" means includes but not limited to, the term "comprising" means including but not limited to. The term "based on" means based at least in part on. The term "number" means any natural number equal to or greater than one. The terms "a" and "an" are intended to denote at least one of a particular element. Several examples will now be described with reference to the accompanying drawings.

FIG. 1 shows an example of a system 100 according to the present disclosure. The system includes a first processor 10, a first memory 20, a second memory 120 and a controller 110 which is to control access to the second memory 120.

The first processor 10 may include single or multiple processing units, such as one or more central processing units (CPU), one or more processors of a system on chip, an application specific integrated chip (ASIC), field programmable gate array (FPGA), or any other type of hardware processing unit. The first processor may retrieve and execute instructions stored in a memory.

The first memory 20 may be a local memory which is accessible by the first processor 10. The first memory 20 may, for example, include any volatile memory (e.g. dynamic random access memory or DRAM), static random access memory or SRAM, etc.).

The second memory 120 may be accessible to the first processor 10 via a memory controller 110. The second memory 120 may be a persistent memory formed from non-volatile memory devices (e.g. flash memory devices, phase-change memory devices, spin-transfer torque memory devices, resistive random-access memory or memristive devices, etc.).

The memory controller 110 may be a device which controls access to the second memory 120. The memory controller may include a memory side accelerator (MSA). The memory controller 110 may write data to and read data from memory addresses in the second memory 120.

The system 100, may be part of a distributed system in which the first processor 10 and the first memory 20 are on a node of the distributed system and the second memory 120 is a pool of persistent memory shared between a plurality of nodes.

The first memory 20 stores a data capability 24 and a handle 22 to a master capability (MCAP) 122 which is associated with the data capability 24. As generally described herein a handle denotes a data structure that points to a range of memory addresses.

The first processor 10 may access the second memory 120 via the memory controller 110, as shown by the connecting lines in FIG. 1. The data capability 24, handle 22 and MCAP 122 each point to a respective range of memory addresses as shown by the arrows in FIG. 1.

The data capability 24 points to a first range of memory addresses 130 in the second memory 120. The data capability 24 provides access rights to this first range of memory addresses 130 and may be referred to as a data capability for the first range of memory addresses. Data 124 may be stored in the first range of memory addresses 130. The handle 22 points to a second range of memory addresses 132 in the second memory 120. This second range of memory addresses 132 stores a master capability (MCAP) 122.

Therefore, the handle 22 may be said to reference a master capability (MCAP) 122 stored in the second memory 120.

The master capability (MCAP) 122 provides access rights for a third range of memory addresses 134. Thus, the master capability 122 points to the third range of memory addresses 134 as shown by the arrow in FIG. 1. The first range of memory addresses 130 which is pointed to by the data capability 24 may lie within the third range of memory addresses 134 which the MCAP 122 confers access rights for.

In order to access a memory region of the second memory 120, the first processor 10 may present an access request including both a data capability and a handle which references a master capability.

Figure 2:
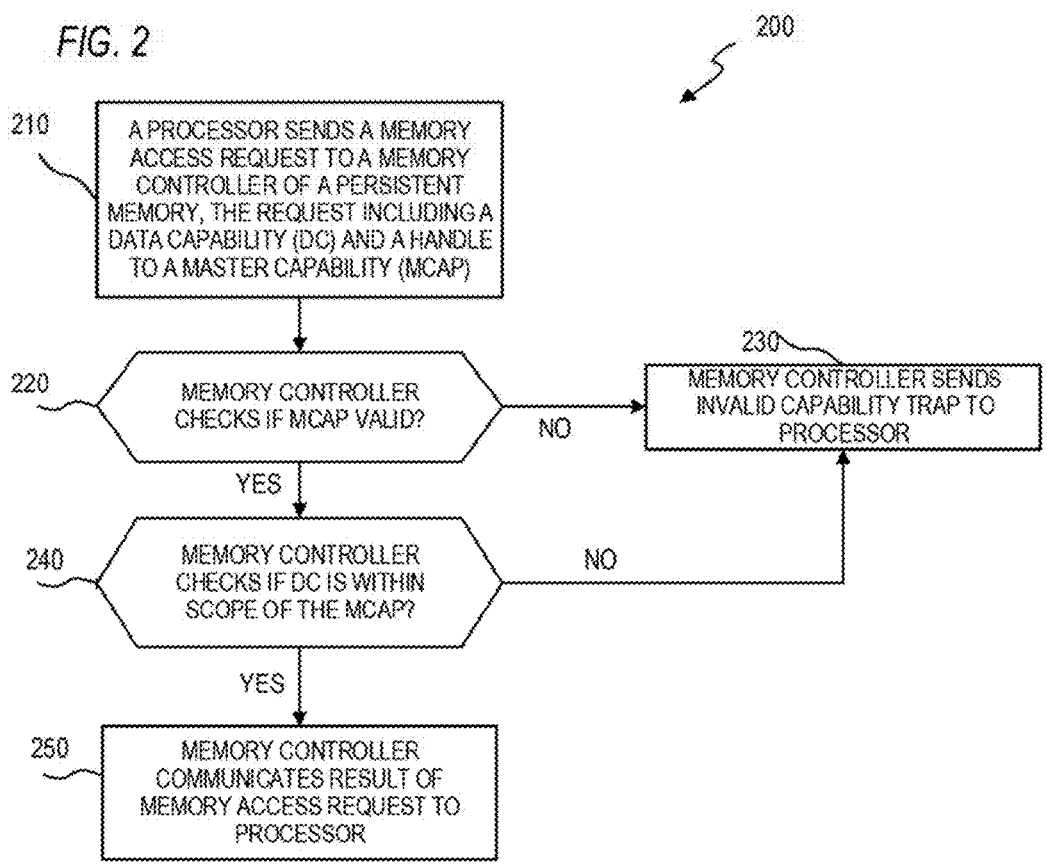
FIG. 2 is a flow diagram of an example method according to the present disclosure.

FIG. 2 shows an example method 200 by which a processor may be granted access to a memory. The method may be employed by the system 100 of FIG. 1, or another similar system.

At block 210, a processor (e.g. processor 10 shown in FIG. 1) sends a memory access request to a memory controller (e.g. memory controller 110) of a persistent memory (e.g. second memory 120). The memory access request includes a data capability (e.g. data capability 24) and a handle (e.g. handle 22) to a master capability (MCAP) (e.g. MCAP 122). The memory access request may have been generated by reading the data capability and the handle from a local memory (e.g. local memory 20) of the processor (e.g. processor 10).

At block 220, the memory controller (e.g. memory controller 110) checks if the handle (e.g. handle 22) references a valid MCAP (e.g. MCAP 122).

If at block 220, the memory controller (e.g. memory controller 110) determines that the MCAP (e.g. MCAP 122) is not valid, then the method proceeds to block 230 where the memory controller (e.g. memory controller 110) sends an invalid capability trap to the processor (e.g. processor 10).

In response to receiving the invalid capability trap, the processor (e.g. processor 10) may delete or revoke the data capability (e.g. data capability 24). The processor (e.g. processor 10) may further revoke the handle (e.g. handle 22) associated with the invalid MCAP and may revoke any other data capabilities associated with the same handle and stored in a local memory (e.g. local memory 20) of the processor.

If at block 220, the memory controller (e.g. memory controller 110) determines that the MCAP (e.g. MCAP 122) is valid, then the method proceeds to block 240.

At block 240, the memory controller (e.g. memory controller 110) checks if the data capability (e.g. data capability 24) is within the scope of the master capability (e.g. MCAP 122) referenced by the handle (e.g. handle 22).

For example, the data capability may be within the scope of the master capability if the rights, such as the range of addresses and permissions, granted by the data capability are not more expansive than the rights granted by the master capability.

If at block 240, the memory controller (e.g. memory controller 110) determines that the data capability (e.g. data capability 24) is outside the scope of the master capability (e.g. MCAP 122), then the method proceeds to block 230, where the memory controller (e.g. memory controller 110) sends an invalid capability trap to the processor (e.g. processor 10).

If at block 240, the memory controller (e.g. memory controller 110) determines that the data capability (e.g. data capability 24) is within the scope of the master capability (e.g. MCAP 122), then the method proceeds to block 250.

At block 250, the memory controller (e.g. memory controller 110) communicates a result of the memory access request to the processor (e.g. processor 10).

For example, if the memory access request was a read request to a first range of memory addresses in the persistent memory (e.g. second memory 120), then the memory controller (e.g. memory controller 110) may send the contents of the first range of memory addresses to the processor (e.g. processor 10). On the other hand, if the memory access request was a write request to write data to a first range of memory addresses in the persistent memory (e.g. second memory 120), then the memory controller (e.g. memory controller 110) may write the data to the first range of memory addresses and report successful completion of the write request to the processor (e.g. processor 10).

While the blocks are shown in a particular order in FIG. 2, it is to be understood that blocks 220 and 240 could be carried out in the opposite order, or concurrently.

Figure 3:
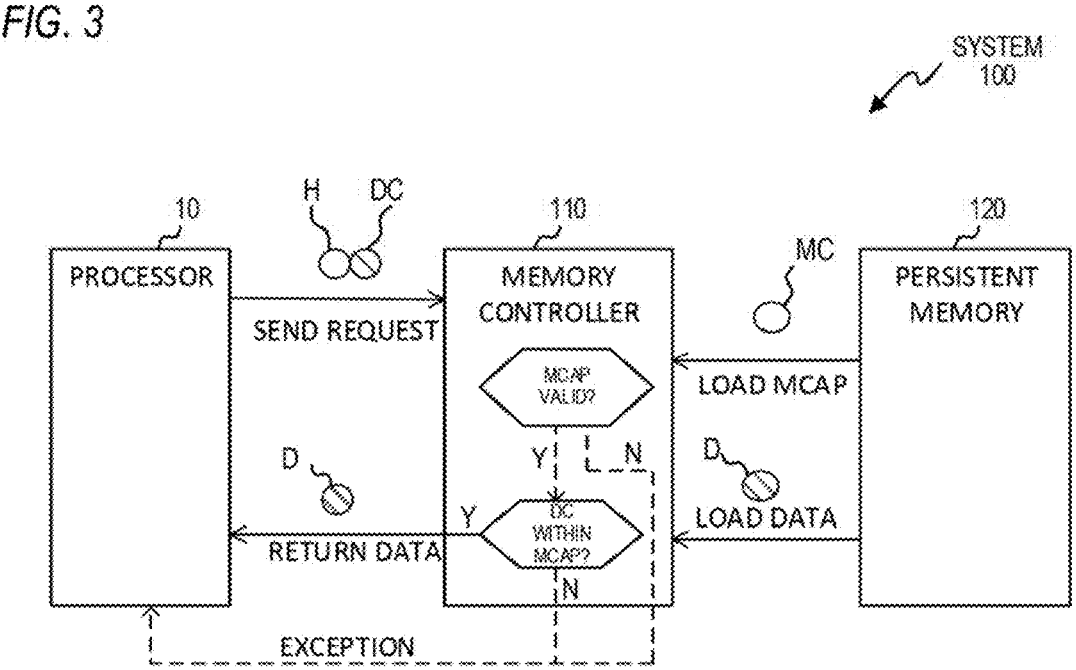
FIG. 3 is a schematic diagram showing an example of processing a load request according to the present disclosure.

FIG. 3 shows an example of the method of FIG. 2 being applied to a memory read request in a system similar to the system of FIG. 1. For example, the read request may be a load request to load data from a first range of memory addresses in a persistent memory. Like reference numerals denote like parts as in FIG. 1.

The processor 10 sends an access request to the memory controller 110. The access request includes a data capability (DC) and a handle (H) to a master capability. Both the data capability and the handle may point to respective address ranges in the persistent memory 120.

In response to receiving the access request, the memory controller 110 loads the master capability (MC) from the persistent memory 120. The memory controller then determines if the master capability (MC) is valid.

In other examples, the memory controller 110 may have already previously loaded the MC and stored it in a cache of the memory controller 110. In that case, the memory controller 110 may determine that the handle (H) points to a master capability which is already in a cache of the memory controller 110 and that the validity of the master capability has already been confirmed.

In addition to checking the validity of the master capability, the memory controller 110 also checks whether the data capability is within the scope of the master capability. If the master capability is invalid, or if the data capability is not within the scope of the master capability, then an exception is generated and may be sent to the processor.

While FIG. 3 shows the memory controller 110 as first checking whether the master capability is valid and then checking if the data capability is within the scope of the master capability, these processes could be carried out in the opposite order or concurrently.

In addition to checking the master capability, the memory controller 110 loads from the persistent memory 120, data (D) stored in the range of memory addresses pointed to by the data capability. This loading of data (D) may be carried out in parallel with loading the master capability to the memory controller 110 and/or checking that the data capability is within the scope of the master capability.

Thus, in response to receiving the memory access request, the memory controller 110 may check whether the handle (H) references a valid master capability in parallel with retrieving data stored in the first range of memory addresses. As these operations may be carried out in parallel, the performance impact on read requests may be kept small.

Figure 4:
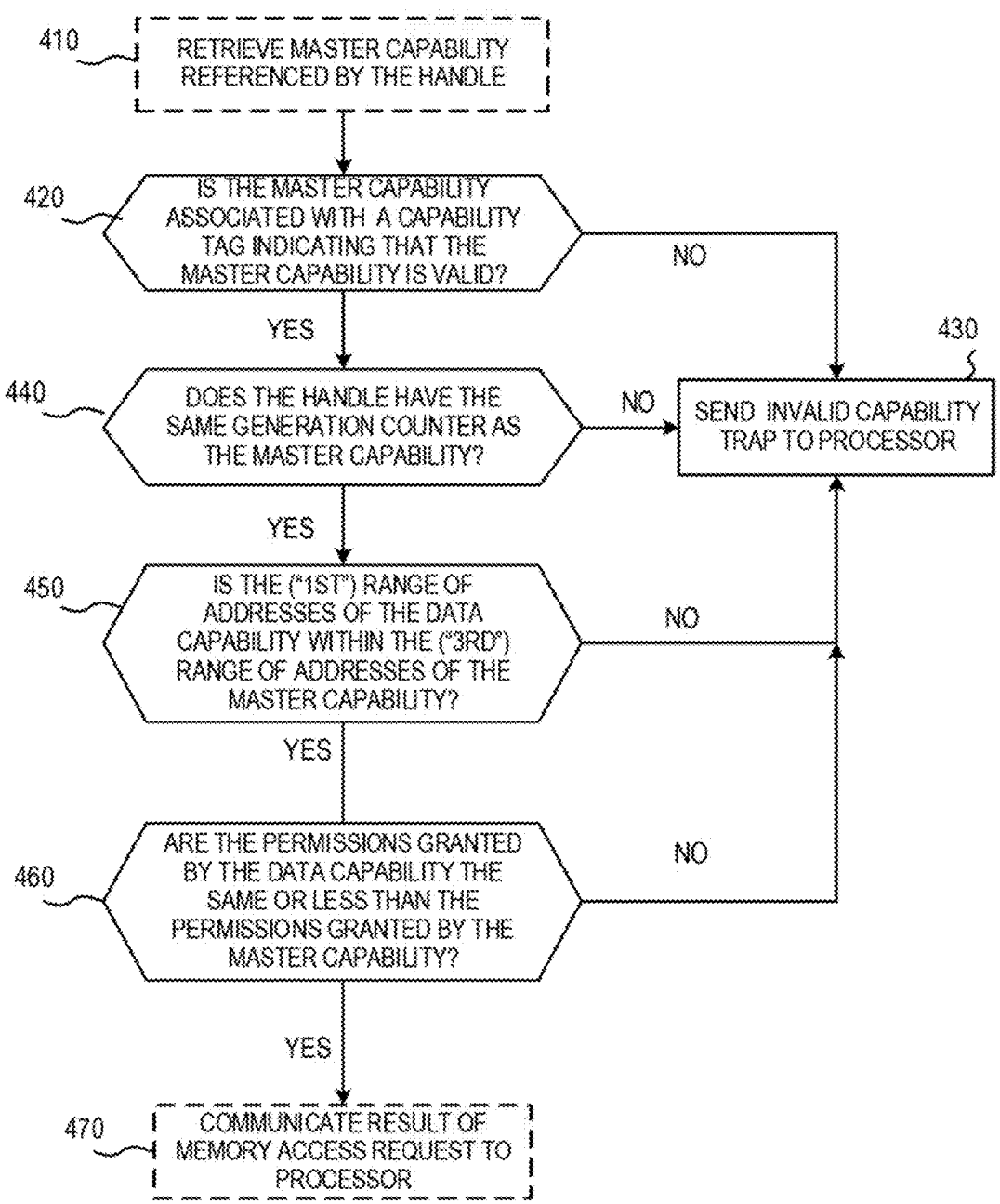
FIG. 4 is an example method which may be used by a memory controller according to the present disclosure.

FIG. 4 shows an example method of a memory controller checking a master capability that is referenced by a handle in a received memory access request.

At block 410, the memory controller (e.g. memory controller 110 of FIG. 1) may retrieve the master capability referenced by the handle. For example, the memory controller may load the master capability from the persistent memory by getting the address of the MCAP from the handle and dereferencing the address. Or the memory controller may determine that the referenced master capability has previously been loaded and is stored in a cache of the memory controller.

At block 420, the memory controller (e.g. memory controller 110) may determine if the master capability is associated with a capability tag which indicates that the master capability is valid. For example, the capability tag may be stored in the persistent memory. In one example, the capability tags may be stored in a separate area of the persistent memory to the capabilities. If the master capability does not have an associated capability tag or if the tag is not set, then this indicates that the capability is not valid. For example, the capability may have been illegally copied or forged. The check for the capability tag may be carried out at the same time as loading the master capability from persistent memory.

If the memory controller determines that the master capability does not have an associated capability tag, then the method proceeds to block 430.

At block 430, the memory controller sends an invalid capability trap to the processor. For example, this may be the same as block 230 of FIG. 2.

In blocks 440 to 450, the master capability may be compared to the handle.

At block 440, the memory controller determines if a generation counter of the handle is the same as a generation counter of the master capability. A used herein a generation counter is a number which indicates a generation of the handle or master capability. If the handle has a different generation counter to the master capability which the handle points to, this indicates that the handle references to a different (e.g. earlier) generation of the master capability which is no longer valid. In that case the method proceeds to block 430, which is described above.

At block 450, the memory controller determines if the address range of the data capability is within the address range of the master capability. For example, with reference to FIG. 1, the memory controller determines if the first range of addresses 130 associated with the data capability are within the third range of addresses 134 which the master capability provides access rights for. If not, then the data capability is outside the scope of the master capability and the method proceeds to block 430, which is described above.

At block 460, the memory controller determines if the permissions granted by the data capability are the same or less than the permissions granted by the master capability. For example, if the data capability includes a read only permission and the master capability includes both read and write permissions, then the permissions granted by the data capability are less than the permissions granted by the master capability. If the data capability includes read and write permissions and the master capability includes read and write permissions, then the permissions granted by the master capability are the same as the permissions granted by the data capability. However, if the data capability includes read and write permissions, while the master capability includes a read only permission, but does not include a write permission, then the data capability includes greater permissions than the master capability and is thus outside the scope of the master capability. The same principle may be applied analogously to other types of permission.

If the memory controller determines that the data capability is outside the scope of the master capability, then the method proceeds to block 430, which is described above.

While blocks 420, 440, 450 and 460 are shown in one particular order in FIG. 4, it is to be understood that these blocks may be carried out in any order relative to each other. Further, some or all of these blocks may be carried out concurrently. If the memory controller determines that the checks of each of blocks 420, 440, 450 and 460 are affirmative (i.e. the master capability referenced by the handle is valid and the data capability is within the scope of the master capability), then the access request may be granted.

For example, if the access request is a write request, then the data may be stored in the persistent memory. For instance, the memory access request may be a store instruction to store data in the first range of memory addresses. On the other hand, if the access request is a read request then the data may be loaded from the persistent memory, if the data has not already been loaded in parallel with loading and checking the validity of the master capability.

At block 470, the memory controller communicates the result of the memory access request to the processor. This may be the same as block 250 of FIG. 2. For example, loaded data may be returned to the processor or confirmation of a successful write may be sent to the processor.

Figure 5:
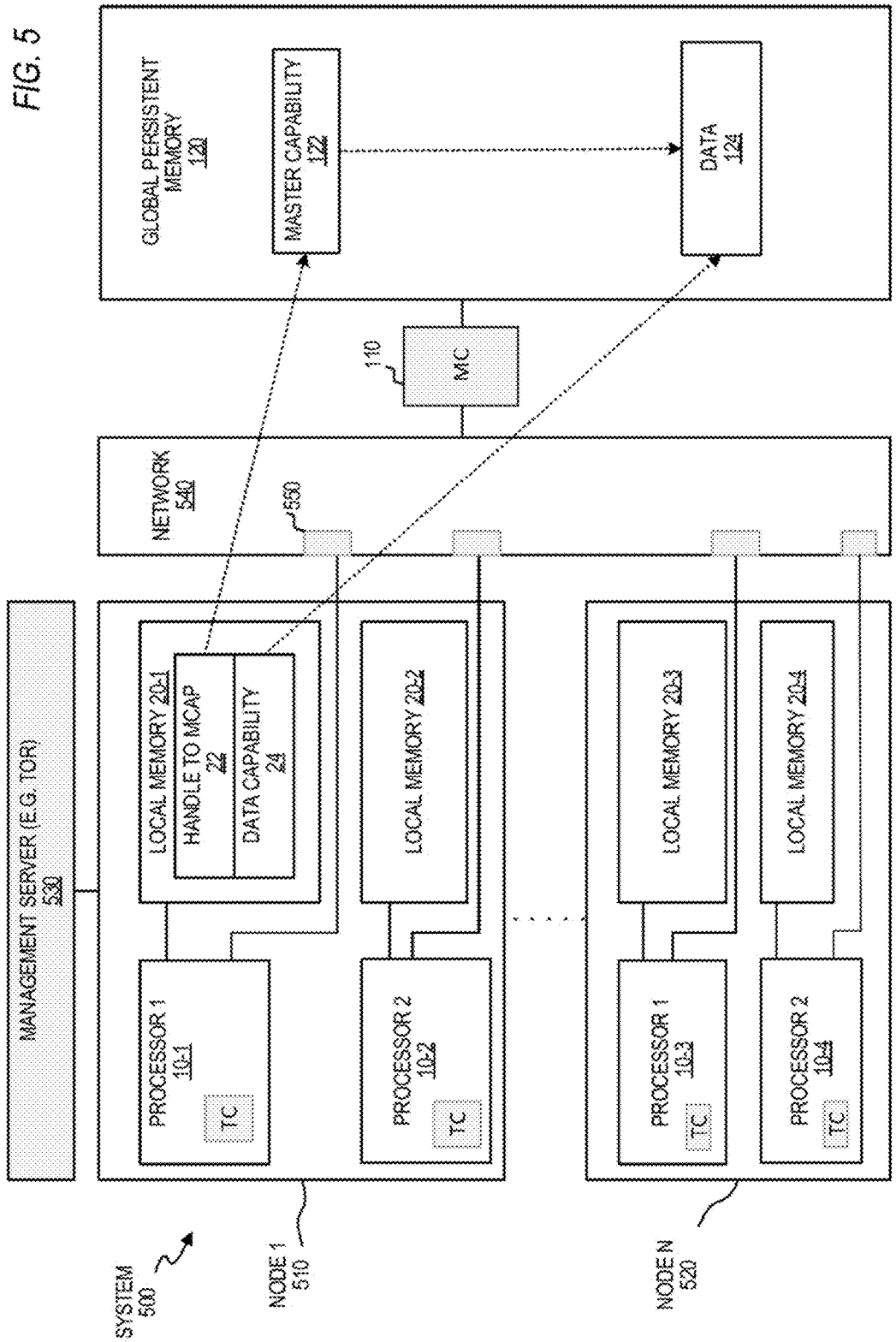
FIG. 5 shows a schematic view of an example system according to the present disclosure in which the persistent memory is external to a plurality of nodes.

FIG. 5 shows an example of a distributed system 500 according to the present disclosure. The system 500 comprises a plurality of local nodes 510, 520 and a global persistent memory 120. The global persistent memory 120 is external to the plurality of local nodes 510, 520 and connected to the local nodes by a network 540. While two local nodes, a first node 510 and an Nth node 520 are shown in FIG. 5, there may be further local nodes as indicated by the dotted line between the first node 510 and the Nth node 520.

In one example, the system 500 is housed in a single server rack. The network 540 may be a switching fabric of the server connecting together the individual nodes 510, 520 and the global persistent memory 120, which may be a shared pool of memory.

The global persistent memory 120 may be the same as or similar to the second memory 120 shown in FIG. 1. The global persistent memory 120 may be formed from non-volatile memory devices (e.g. flash memory devices, phase-change memory devices, spin-transfer torque memory devices, resistive random-access memory or memristive devices, etc.).

Each of the local nodes includes at least one processor and local memory. The first local node 510 includes a first processor 10-1 and a first local memory 20-1 which is accessible by the first processor 10-1. The first processor 10-1 and the first local memory 20-1 may be analogous to the processor 10 and first memory 20 described above with reference to FIGS. 1-4. In FIG. 5, the first local node 510 further includes a second processor 10-2 and a second local memory 20-2 which is accessible to the second processor 10-2. The second processor 10-2 and the second local memory 20-2, may be similar to the first processor 10-1 and the first memory 20-1. In other examples, the first local node 510 may include further processor and local memories.

The Nth local node 520 includes a first processor 10-3 and a second processor 10-4, as well as local memories 20-3 and 20-4 accessible by the first local node and second processors 10-3, 10-4 respectively. In other examples, the Nth local node 520 may include further processors and local memories. The other local nodes, if any, may have a similar structure. The local nodes may have the same or different numbers of processors and local memories to each other.

Each of the processor(s) of the local nodes 10-1, 10-2, 10-3, 10-4 may include single or multiple processing units, such as one or more central processing units (CPU), processor of a system on chip, an application specific integrated chip (ASIC), field programmable gate array (FPGA), or other type of hardware processing unit etc. Each processor may retrieve and execute instructions stored in a local memory. The local memories 20-1, 20-2, 20-3, 20-4 may include any volatile memory (e.g. dynamic random access memory or DRAM), static random access memory or SRAM, etc.

The processors of the local nodes 510, 520 may access the shared pool of persistent memory 120 over a network 540 which connects the local nodes 510, 520 with the shared pool of global persistent memory 120. Access to the persistent memory 120 may be handled by a memory controller 110, which may be analogous to the memory controller 110 described above with respect to FIGS. 1-4. The memory controller 110 may include a memory side accelerator (MSA). While a single memory controller 110 is shown in FIG. 5, in other examples there may be a plurality of memory controllers that manage access to the persistent memory 120. For example, there may be one memory controller per node, or if the persistent memory includes a plurality of memory banks, each memory bank may be coupled to a respective memory controller.

The global persistent memory 120 is said to be at least partially shared, meaning that at least some parts of the global memory are shared between at least some of the local nodes.

Within a local node (e.g. 510), an operating system running on the local processor (e.g. 10-1) may govern access to the local volatile memory (e.g. 20-1). This may be accomplished by memory paging or other similar approaches. However, access to the global persistent memory 120 may be governed by capabilities. The capabilities used by a processor (e.g. 10-1) to access the global persistent memory 120 may be stored in a local memory (e.g. 20-1) of the processor.

Data capabilities which provide access rights to ranges of memory addresses in the persistent memory may be linked to handles which point to a master capability (MCAP) from which the data capability is derived. For example, as shown in FIG. 5, the local memory 20-1 may store a data capability 24 and a handle 22 linked to the data capability 24. As indicated by the dotted arrows, the data capability 24 may point to a first range of memory addresses in the persistent memory 120 in which data 124 is stored. Meanwhile, the handle 22 may point to a MCAP 122 which provides access rights to a third range of memory addresses including the first range of memory addresses in which the data 124 is stored. This may be implemented in the same way as discussed above with respect to FIGS. 1-4.

The processor 10-1 may access the persistent memory via the network 540 and the memory controller 110. The memory controller 110 may handle the access requests in the manner described above in FIGS. 1-4. The processor 10-1 may generate an access request based on the data capability 24 and associated handle 22 stored in local memory 20-1.

The network 540 may include one or more access control components 550. The access control components 550 may be programmed with rules which define which ranges of memory addresses in the persistent memory 120 which a local node (e.g. node 510) is allowed to access. The access control components 550 may be programmed by a trusted component, such as a trusted zone of a processor (e.g. processor 10-1) of a local node, the management server 530 or both. If an access request is within an allowed range for a particular local node (e.g. node 510), the access control component 550 may allow the access request to be passed through the network 540 to the memory controller 110. In this way the access control component(s) may act as a firewall to prevent unauthorized nodes from sending access requests to the persistent memory. Upon receiving a memory access request, the memory controller 110 may allow the request or generate an exception using any of the methods explained above with reference to FIGS. 1-4. Thus the access control component 550 determines whether or not the network 540 will pass a memory access request from a local node (e.g. node 510) to the memory controller 110. The memory controller determines whether or not to grant the memory access request based on the data capability, handle and master capability. In some other examples the network 540 may not include the access control components 550 so that all memory access requests are passed to the memory controller 110.

In the interests of clarity, FIG. 5 just shows one data capability 24 and one handle 22 in the local memory 20-1. However, it is to be understood that the first local memory 20-1 may store other data capabilities and associated handles to allow the first local processor 10-1 to access the global persistent memory 120. Likewise, the second memory may store other data capabilities and handles to allow the second processor 10-2 of the first node 510 to access the global persistent memory 120. Same for the local memories and processors of the other local nodes.

Access to the persistent memory 120 may be granted at the level of a node. Capabilities may be used to grant local nodes access rights to regions of persistent memory in a fine-grained and flexible fashion. Compared to paging, capabilities allow for finer grained protection as they may specify a particular range of memory addresses space which may be smaller than a page of memory addresses. Further capabilities specify which particular permissions such as read and write are granted. Capabilities are flexible in that the size of a capability may vary from the smallest memory unit to the entire address space and the size and permissions of a capability can be chosen according to the needs of the application which is given the capability.

Capabilities may be granted at the node level, so at the sub-node level capabilities may be shared by multiple different processes running on the same node. The operating system running on the processor(s) of a node may use paging or other mechanisms to prevent concurrent access to the same area of global persistent memory by different processes running on the same node.

The way in which the persistent memory 120 is shared between the local nodes 510, 520 may be determined by a management server 530 of the system 500 in conjunction with the trusted components of the local nodes. The management server 530 may determine whether a requested data capability may be granted to a particular local node. In this way, the management server 530 may determine how and in what way the local nodes 510, 520 may use the persistent memory 120. For example certain areas of the persistent memory 120 may be accessible by just one node, while other areas may be accessible by subset of the local nodes or by all local nodes.

At least part of the persistent memory 120 may be shared by the first and Nth local nodes 510, 520. Therefore, the first and Nth local nodes may possess (i.e. store in their local memories) data capabilities which point to the same or overlapping areas of the persistent memory.

The master capabilities 122 may be stored in a reserved area of the persistent memory 120. The reserved area may not be available for storing normal data. The system 500 may be arranged such that a reserved virtual address space in which the master capabilities 122 are stored is mapped to a same physical address space of the persistent memory 120 by each of the processors 10-1, 10-2, 10-3, 10-4 of the various nodes.

Figure 6:
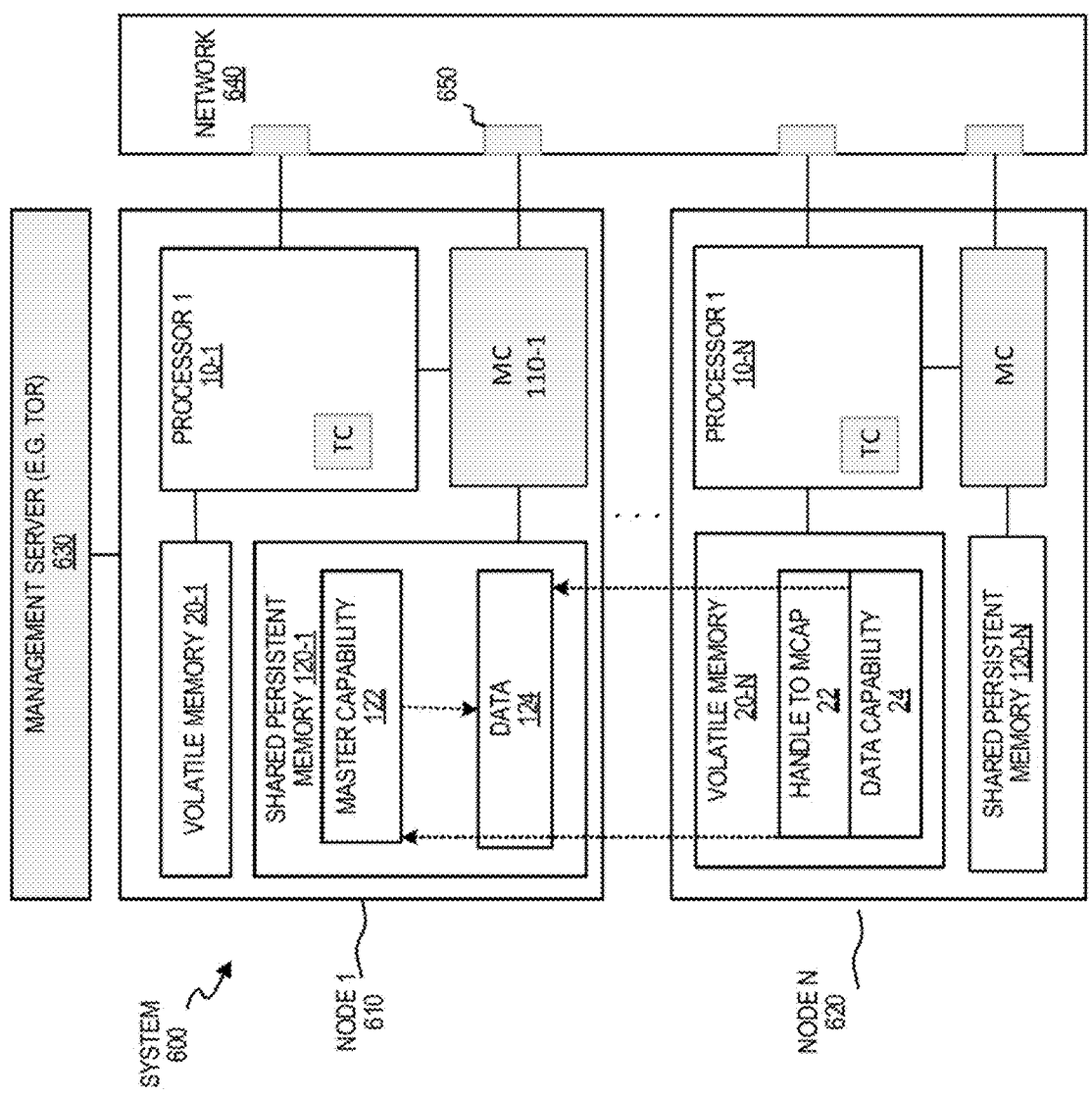
FIG. 6 shows a schematic view of an example system according to the present disclosure in which the persistent memory is local to a node.

FIG. 6 shows a similar distributed system 600, but on which the shared persistent memory 120 is local to each node rather than being external to the nodes as in FIG. 5. The system 600 comprises a plurality of local nodes including at least a first node 610 and an Nth node 620. The local nodes 610, 620 are connected by a network 640. The local nodes 610, 620 may be on a single server rack and the network 640 may be a switching fabric of the server rack.

Each node of the system 600 includes at least a processor and a volatile memory. At least some of the nodes may also include a shared persistent memory and a memory controller by which the local processor, or a processor of another node may access the shared persistent memory.

Thus, as shown in FIG. 6, the first node 610 may include a processor 10-1 and a volatile memory 20-1. These may be the same as the processor (e.g. processor 10-1) and local memory (e.g. local memory 20-1) of the nodes shown in FIG. 5. The first node 610 also includes a shared persistent memory 120-1 which may have the same structure as the shared persistent memory 120 of FIG. 5. However, rather than being external to all of the local nodes, the shared persistent memory 120-1 is local to the first node 610. The shared persistent memory 120-1 may be shared between the first node 610 and at least one other node, such as Nth node 620.

The shared persistent memory 120-1 is accessible via a memory controller 110-1 of the first node. The shared persistent memory 120-1 may for example be accessed via the memory controller 110-1 by the processor 10-1 of the first node or by a processor of another node via the network 640. The system 600 may be set up such that the shared persistent memory 120-1 may be accessed by processes running on a processor of a node. This access may be regulated by the memory controller 110-1 and/or by an access control component 650 of the network switching fabric 640.

The system 600 may use the same system of data capabilities, handles and master capabilities described above with reference to FIGS. 1-5 to control access to the shared persistent memory 120-1. For example, FIG. 6 depicts a volatile memory 20-N of the Nth node 620 as storing a data capability 24 and a handle 22 which point to respective ranges of memory addresses in the persistent memory 120-1 which store data 124 and master capability 122. Thus by reading the data capability 24 and associated handle 22 from the local volatile memory 20-N, the processor 10-N of the Nth node 620 is able to access data 124 stored on the shared persistent memory 120-1 of the first node 610.

Likewise, the processor 10-1 of the first node 610 may be able to access data (not shown) stored on the shared persistent memory 120-N of the Nth node 620, by reading a data capability (not shown) and handle (not shown) stored on the local volatile memory 20-1 of the first node 610. While just one processor and volatile memory is shown on the first node and the Nth node for clarity, either or both of the nodes may include a plurality of volatile memories and local processors. Likewise, there may be a plurality of other nodes connected to the network 640, at least some of which may also include a shared persistent memory and memory controller, as well as local processor and volatile memory. The access control component(s) 650 may act in the same way as the access control components 550 described in FIG. 5.

While the systems of FIG. 5 and FIG. 6 have a different arrangement, they share the same approach for managing access to shared persistent memory through data capabilities and handles to master capabilities. In both cases a processor (e.g. processors 10, 10-1) is located together with a volatile memory (e.g. local memories 20, 20-1) on a first node (e.g. nodes 510, 610) of the system and a persistent memory (e.g. memories 120, 120-N) is located externally to the first node (e.g. nodes 510, 610) and shared by the first node and at least one other node (e.g. nodes 520, 620) of the system.

Figure 7A:
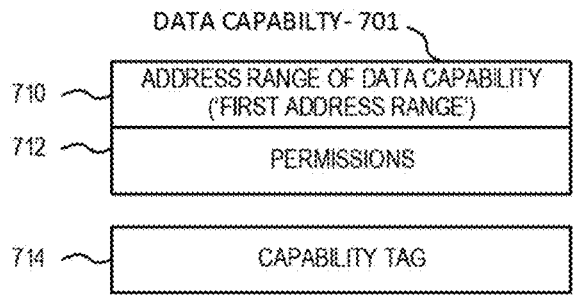
FIG. 7A shows an example data capability.

FIG. 7A shows an example of a data capability 701. The data capability 701 includes an address range 710. The address range 710 may include a base and a length and may correspond to a range of memory addresses in persistent memory, such as the first range of memory addresses in FIG. 1. The data capability 701 further includes a set of permissions 712. The set of permissions 712 includes at least one operation which the data capability provides rights for in respect of the range of memory addresses 710. In one example, the set of permissions 712 may include a plurality of permission bits with each bit indicating that a specified operation (e.g. read, write, execute etc.) is either allowed or not allowed.

The data capability 701 may be associated with a capability tag 714. The capability tag 714 may be stored in the same or a separate region of the local volatile memory in which the data capability 701 is stored. In one example, the capability tag is stored in an area of memory which is not visible or accessible to the user or applications running on the processor. For instance, the capability tag may be stored in a reserved area of memory which is available to a trusted component, such as a trusted zone of a processor of the node, the memory controller or the management server. A processor may verify whether the capability tag is present when loading the data capability into a register of the processor. If the capability tag is not present this may indicate that the data capability 701 was forged and is not valid.

Figure 7B:
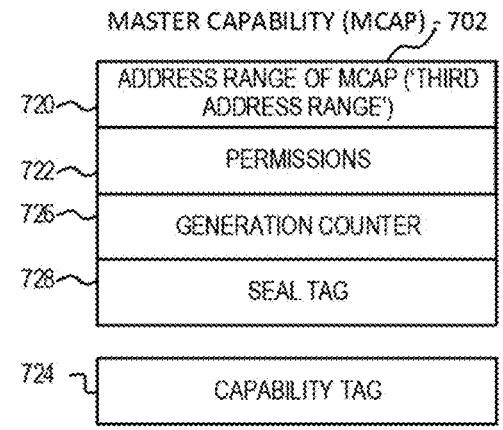
FIG. 7B shows an example master capability.

FIG. 7B shows an example of a master capability 702 which may be stored in a reserved region of persistent memory. The master capability includes an address range 720. The address range 720 may include a base and a length and may correspond to a range of memory addresses in persistent memory which the master capability provides access rights for, such as the third range of memory addresses in FIG. 1. The master capability 702 further includes a set of permissions 722. The set of permissions 722 includes at least one operation which the master capability provides rights for in respect of the range of memory addresses 720. In one example, the set of permissions 722 may include a plurality of permission bits with each bit indicating that a specified operation (e.g. read, write, execute etc.) is either allowed or not allowed. The master capability 702 may further include a generation counter. The generation counter 726 may be a number which indicates a generation of the master capability. The generation counter may be incremented when a master capability is to be replaced.

The master capability 702 may further include a sealing tag 728. The sealing tag 728 may prevent the address range 720 and permissions 722 of the master capability 702 from being modified. This is in contrast to the data capability 701. A data capability may have its address range and permissions modified, but only to reduce and not enlarge their scope, but a master capability may have a set address range and permissions which may not be modified. This may be enforced by the ISA and hardware which may be configured to not allow modification of the address range and permissions of a capability including a sealing tag.

The master capability may be associated with a capability tag 724. The capability tag 724 may be stored in the same or a separate region of persistent memory. The memory controller may verify that the capability bit is present when loading the master capability from persistent memory. If it is not present this may indicate that the master capability 702 is not valid. For instance, the master capability 702 may be invalid because it has been forged, revoked or deleted etc. and in these cases the capability bit will not be present.

Figure 7C:
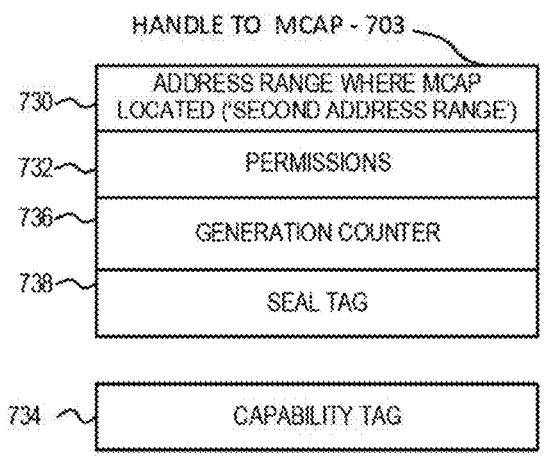
FIG. 7C shows an example handle to a master capability.

FIG. 7C shows an example of a handle 703 to a master capability. The handle may be stored in local volatile memory. The handle 703 includes an address range 730. The address range 730 may include a base and a length and may point to a range of memory addresses in persistent memory which the handle references. The range of memory addresses which the handle points to may store a master capability. In this way, the handle 703 references a master capability. The handle 703 may further include a set of permissions 722. The set of permissions 732 includes at least one operation which the handle provides rights for in respect of the range of memory addresses 730 and includes at least a read permission.

The handle 703 may further include a generation counter 736. The generation counter 736 may be a number which indicates a generation of the master capability which the handle references. When a master capability which the handle references is loaded into a memory controller, the memory controller may check that the generation counter of the handle is the same as the generation counter of the master capability. If the loaded master capability has a different generation counter, this may indicate that the handle is out of date and references a previous generation of the master capability which is no longer valid.

The handle 703 may further include a sealing tag 738. The sealing tag 738 may prevent the address range 730 and permissions 732 of the handle 703 from being modified. This may help to prevent the handle from being forged or illegally modified to point to a different area of persistent memory. This may be enforced by the ISA and hardware which may be configured not to allow modification of the address range and permissions of a handle including a sealing tag.

The handle 703 may be associated with a capability tag 734. The capability tag 734 may be stored in the same or a separate region of the local volatile memory in which the handle 703 is stored. The capability tag 734 may be stored in an area of memory which is not visible or accessible to the user or applications running on the processor. For example, the capability tag 734 may be stored in a reserved area of memory which is available to the trusted component. A processor may verify whether the capability tag 734 is present when loading the handle into a register of the processor. If the capability tag 734 is not present, this may indicate that the handle 703 was forged or revoked and is not valid.

Figure 7D:
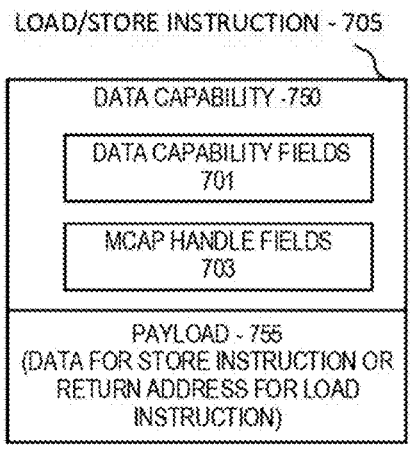
FIG. 7D shows an example load/store instruction.

FIG. 7D shows an example of a load or store instruction 705 according to the present disclosure. The load or store instruction 705 may include an enlarged data capability 750 and a payload 755. The enlarged data capability includes data capability fields 701 which may correspond to the fields of the data capability shown in FIG. 7A, and MCAP handle fields 703 which may correspond to the fields of the handle shown in FIG. 7C. In this way, the data capability 701 and handle 702 are effectively linked together as they are combined into an enlarged data capability 750.

In the case of a store instruction, the payload 755 includes data which is to be stored in the range of memory addresses indicated by the data capability 701. In the case of a load instruction, the payload 755 may include a return address for data loaded from the persistent data memory. For example, the return address may be a range of memory addresses in a local volatile memory accessible by the processor which sent the load instruction.

Figure 7E:
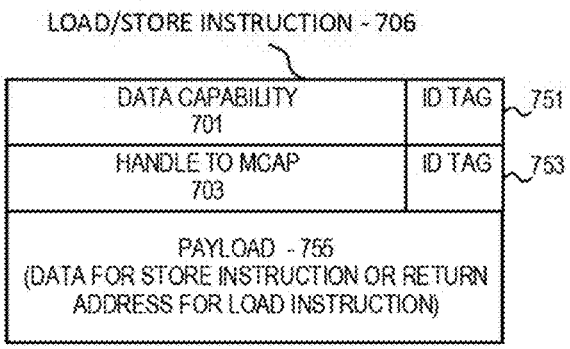
FIG. 7E shows another example load/store instruction.

FIG. 7E shows another example of a load or store instruction, which uses a different method of linking a data capability to a handle. The instruction includes a data capability 701, a handle 703 and a payload 755. In this example, the data capability 701 and handle 703 are separate but each includes an ID tag 751, 753. The ID tag 751 of the data capability 701 may be the same as the ID tag 753 of the handle 703, thus linking the data capability and the handle together. The payload 755 is the same as the payload in FIG. 7D.

FIG. 8 shows an example method 800 of reading data from persistent memory. The method may be carried out by any of the apparatus discussed above.

At block 802, a local processor (e.g. processor 10 in FIG. 1 or 3, or any of processor 10-1 to 10-N in FIGS. 5 and 6) generates a load request including a data capability and a handle. For example, the data capability and the handle may be loaded from a local memory (e.g. local memory 20, 20-1 to 20-N) accessible by the local processor.

At block 804, the local processor determines whether the load request includes a data capability with valid capability tag and a handle with valid capability tag. For example, the determination may include checking whether the data capability is associated with a valid capability tag and whether the handle is associated with a valid capability tag.

If at block 804 it is determined that the data capability or the handle is not associated with a valid capability tag, then the method proceeds to block 806 where the load instruction is aborted. An error message may be generated.

If at block 804 it is determined that the data capability and the handle both are associated with a valid capability tag, then the method proceeds to blocks 808 and 810.

At block 808, the master capability (MCAP) in the second range of memory addresses referenced by the handle is loaded into the memory controller. In other examples, the memory controller may check if the referenced MCAP is in a cache of the memory controller and if so, then the MCAP is loaded into a register of the memory controller.

At block 810, the data in the first range of memory addresses pointed to by the data capability is loaded into the memory controller.

Blocks 808 and 810 may be carried out in parallel. For example, if there are parallel communication links between the memory controller and the persistent memory, then the MCAP may be loaded on a first communication link while the data is loaded on a second communication link. This approach may cut down the delay in processing the load request.

In other examples, for instance if there is a single communication link between the memory controller and the persistent memory, then the data load request and the MCAP load request may be pipelined by the memory controller and sent sequentially to the persistent memory over the single communication link. Thus, by pipelining the requests, the memory controller may send both the MCAP load request and the data load request over the communication link before receiving a response to either. Thus rather than sending an MCAP load request, receiving the MCAP and then sending a data load request and receiving the data, the memory controller may send both the MCAP load request and the data load request and in response receive the MCAP and the data.

At block 812, the memory controller determines if the handle references a valid MCAP. For example, this may include determining if the retrieved MCAP is associated with a valid capability tag. This may be carried out at the same time as loading the MCAP in block 808. Determining if the handle references a valid MCAP may also include comparing a generation counter of the handle with a generation counter of the MCAP. If the generation counters are different or if the MCAP is not associated with a valid capability tag, then a determination may be made that the handle does not reference a valid MCAP.

If at block 812 it is determined that the handle does not reference a valid MCAP, then the method proceeds to block 814. At block 814, the process is aborted and an exception may be generated.

At block 816 it is determined whether the data capability is within the scope of the MCAP. This may include checking whether the permissions and range of memory addresses of the data capability are within the permissions and range of memory addresses of the MCAP, as discussed above in relation to FIG. 4. If the memory controller determines that the data capability is not within the scope of the MCAP, then the process may proceed to block 818. At block 818, the process is aborted and an exception may be generated.

If the data capability is within the scope of the MCAP, then the method may proceed to block 820.

At block 820, the memory controller sends the data which was loaded from the first memory address range of the persistent memory in block 810 to the processor (e.g. processors 10, 10-1 to 10-N) which initiated the load instruction.

At block 822, the processor receives the data from the memory controller.

While the blocks of method 800 have been shown in a particular order, other orders may be used. For example, blocks 812 and 816 may be carried out in the opposite order or concurrently.

Figure 9:
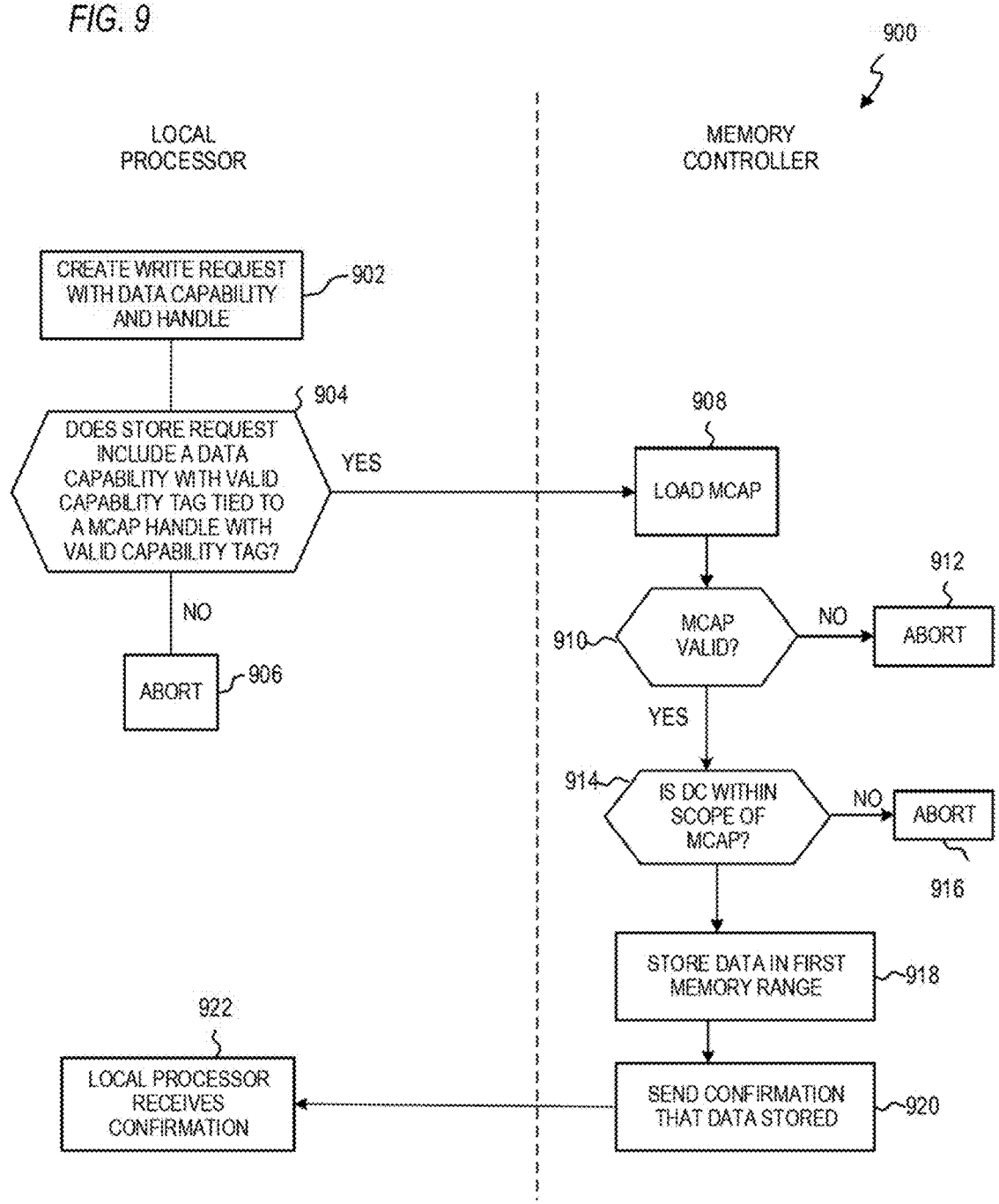
FIG. 9 shows an example method of writing data to persistent memory.

FIG. 9 shows an example method 900 of writing data to persistent memory. The method may be carried out by any of the apparatus discussed above.

At block 902, a local processor (e.g. processor 10 in FIG. 1 or 3, or any of 10-1 to 10-N in FIGS. 5 and 6) generates a store request including a data capability, a handle and data to be stored. For example, the data capability and the handle may be loaded from a local memory (e.g. local memories 20, 20-1 to 20-N) accessible by the local processor.

At block 904, the local processor determines whether the store request includes a data capability with a valid capability tag and a handle with a valid capability tag.

If at block 904 it is determined that the data capability or the handle is not associated with a valid capability tag, then the method proceeds to block 906 where the load instruction is aborted. An error message may be generated.

If at block 904 it is determined that the data capability and the handle both are associated with a valid capability tag, then the method proceeds to block 908.

At block 908, the master capability (MCAP) in the second range of memory addresses referenced by the handle is loaded into the memory controller. In other examples, the memory controller may check if the referenced MCAP is in a cache of the memory controller and if so then load the MCAP into a register of the memory controller.

At block 910, the memory controller determines if the handle references a valid MCAP. For example, this may include determining if the retrieved MCAP is associated with a valid capability tag. This may be carried out at the same time as loading the MCAP in block 908. Determining if the handle references a valid MCAP may also include comparing a generation counter of the handle with a generation counter of the MCAP. If the generation counters are different or if the MCAP is not associated with a valid capability tag, then a determination may be made that the handle does not reference a valid MCAP.

If at block 910 it is determined that the handle does not reference a valid MCAP, then the method proceeds to block 912. At block 912, the process is aborted and an exception may be generated.

At block 914 it is determined whether the data capability is within the scope of the MCAP. This may include checking whether the permissions and range of memory addresses of the data capability are within the permissions and range of memory addresses of the MCAP, as discussed above in relation to FIG. 4. If the memory controller determines that the data capability is not within the scope of the MCAP, then the process may proceed to block 916. At block 916, the process is aborted and an exception may be generated.

If the data capability is within the scope of the MCAP, then the method may proceed to block 918.

At block 918 the memory controller stores the data received in the store instruction into the persistent memory. Specifically, the memory controller stores the data from the payload of the store instruction into the first range of memory addresses specified by the memory range of the data capability of the store instruction.

At block 920, the memory controller sends confirmation of successful completion of the store instruction to the processor, i.e. the memory controller confirms to the processor that the data has been stored in the persistent memory.

At block 922, the processor receives the confirmation from the memory controller.

While the blocks of method 900 have been shown in a particular order, other orders may be used. For example, blocks 910 and 914 may be carried out in the opposite order or concurrently.

Figure 10:
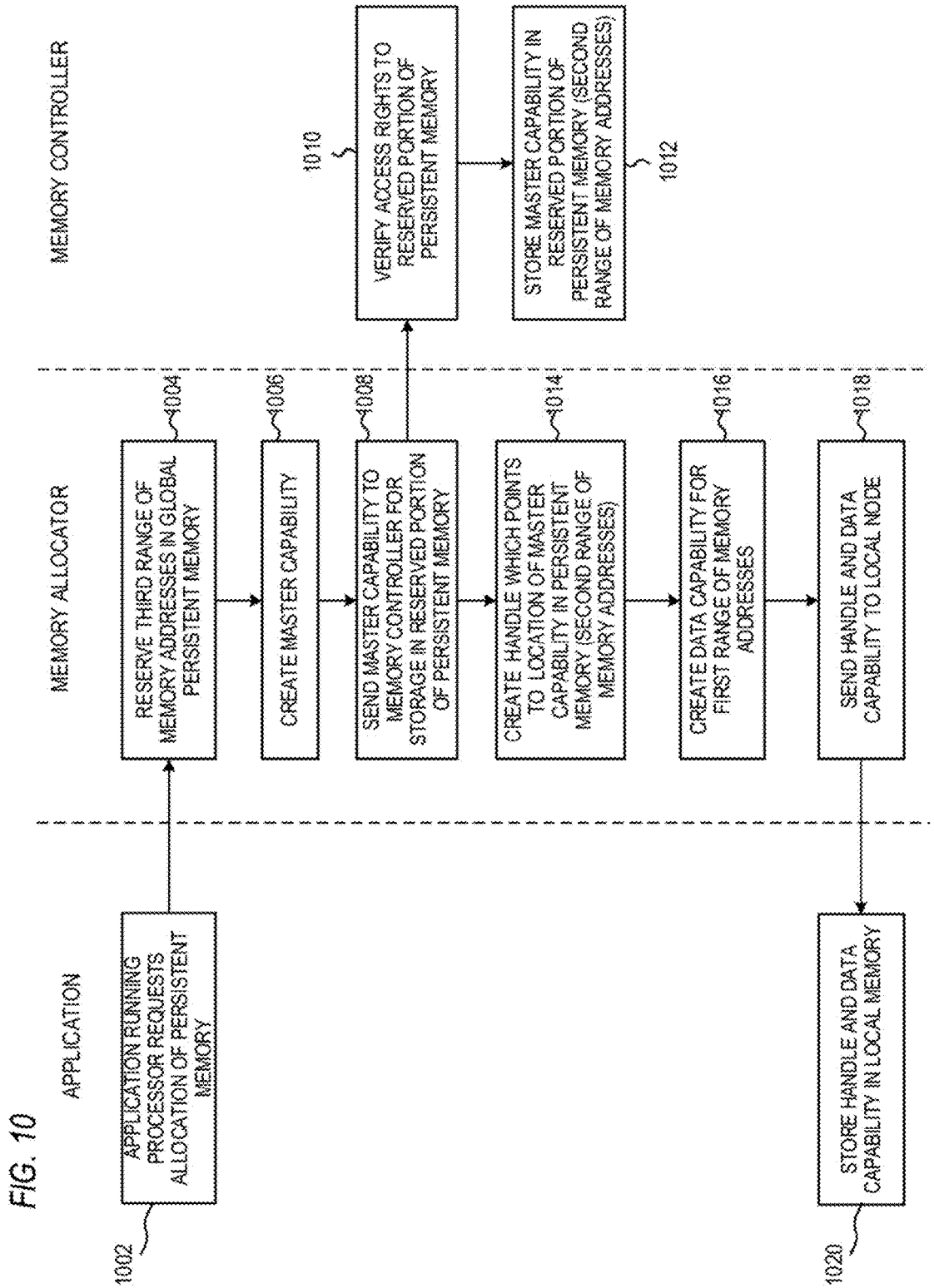
FIG. 10 shows an example method of allocating a range of memory addresses in persistent memory.

FIG. 10 shows an example method 1000 of setting up a master capability (MCAP) in persistent memory in response to an allocation request from an application running on a processor. The method 1000 may be carried out on any of the apparatus described above.

At block 1002, an application running on a processor, e.g. on a CPU of a local node, requests to be allocated an area of persistent memory. This request may be sent to a memory allocator. The memory allocator may be a program running in the operating system or a library of the local node or the top of a rack server.

At block 1004, the memory allocator reserves a range of memory addresses in persistent memory. For example, the memory allocator may reserve a range of memory addresses in persistent memory, such as the third range of memory addresses shown in FIG. 1.

At block 1006, the memory allocator creates a master capability corresponding to the reserved range of memory addresses. The master capability may include a set of permissions. The master capability may have a structure as shown in FIG. 7B.

At block 1008, the memory allocator sends the master capability to the memory controller for storage in a reserved portion of the persistent memory.

At block 1010, it is verified that the party sending the master capability has access rights to the reserved portion of persistent memory. For example, the memory controller and/or an access control function of a network linking the processor and the memory controller may check that the master capability was sent by a trusted component.

If the party sending the master capability is determined to have access rights to the reserved portion of persistent memory, then at block 1012, the memory controller stores the master capability in the reserved portion of persistent memory. For example, the memory controller may store the master capability in the second range of memory addresses shown in FIG. 1. Storing the master capability may also include writing an associated capability tag in the persistent memory to indicate that the master capability is valid.

At block 1014, the memory allocator creates a handle which points to the location of the master capability in persistent memory. For example, the handle may point to the second range of memory addresses shown in FIG. 1. The handle may have a structure as shown in FIG. 7C.

At block 1016, the memory allocator creates a data capability for a range of memory addresses in the persistent memory. For example, the data capability may be for the first range of memory addresses shown in FIG. 1. The data capability may have a structure as shown in FIG. 7A. The first range of memory addresses of the data capability is within the third range of memory addresses of the master capability.

At block 1018, the handle and data capability are sent by the memory allocator to the application. At block 1020, the application stores the handle and the data capability in a local memory of the processor (e.g. local memories 20, 20-1 to 20-N). The processor is then able to use the data capability and the handle to access the persistent memory as explained above, for example in FIGS. 8 and 9.

In some examples, the data capability created in block 1016 may have a same range of memory addresses and permissions as the master capability created in block 1006. In that case, a difference between the data capability and the master capability may be that the data capability does not include a sealing bit and so can be copied and modified in a way which reduces, but not increases, the range of memory addresses and permissions.

Such a data capability may grant access to the entire range of memory addresses reserved in block 1004. However, the data capability may be copied and modified by the application and/or operating system running on the processor to create further derived data capabilities conferring access rights to a subset of the memory addresses and conferring the same or fewer permissions.

Figure 11:
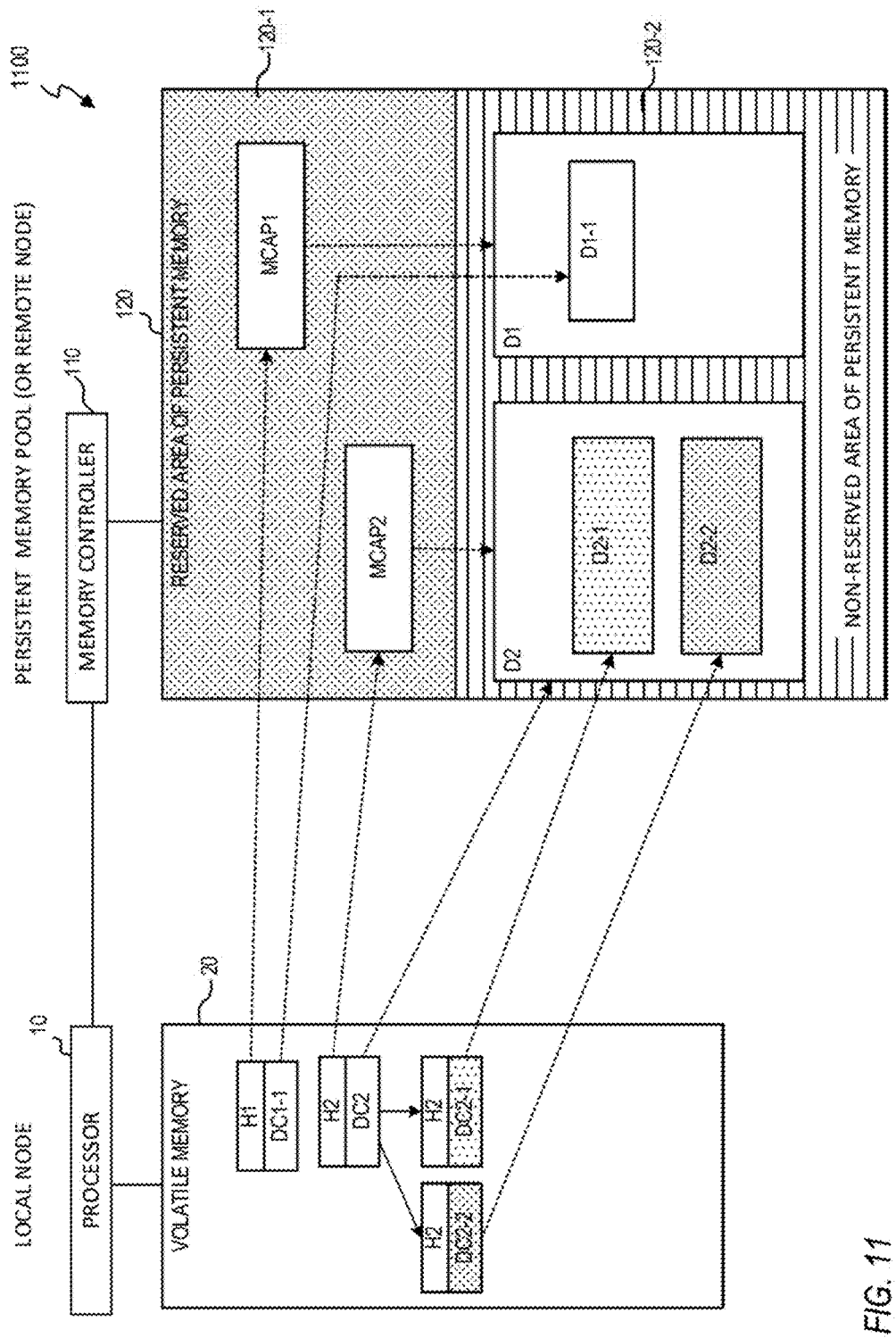
FIG. 11 shows an example system according to the present disclosure.

FIG. 11 shows an example of such derived data capabilities and how one handle may be linked to multiple data capabilities.

The system is similar to that shown in FIG. 1 and includes a processor 10 and a volatile memory 20, which may be the same as the processor 10 and first memory 20 shown in FIG. 1. The system further includes a memory controller 110 and a persistent memory 120, which may be the same as the memory controller 110 and persistent memory 120 shown in FIG. 1.

The processor 10 and the volatile memory 20 may be on a first node, such as one of the local nodes shown in FIGS. 5 and 6. The persistent memory may be a global persistent memory which is external to processor nodes of the system, such as the memory 120 in FIG. 5, or may be located on another node which is remote from the first node such as one of the other local nodes in FIG. 6.

The processor 10 is able to access the persistent memory 120 via the memory controller 110. In some examples the processor may connect to the memory controller 110 via a network, such as a server rack fabric.

The volatile memory 20 may store a plurality of data capabilities and handles. For example, FIG. 11 shows a first data capability DC1-1 together with a first handle H1. The handle H1 points to a first master capability MCAP1 which is stored in reserved area 120-1 of the persistent memory 120. For example, the reserved area may be reserved for storage of master capabilities. The first master capability MCAP1 points to and provides access rights for a range of memory addresses D1 in the persistent memory shown in FIG. 11. The range of memory addresses D1 may lie within a non-reserved area 120-2 of the persistent memory 120. The first data capability DC1-1 points to a range of memory addresses D1-1 which lie within the range of memory addresses D1 which the master capability MCAP1 provides access rights for.

A second data capability DC2 is shown together with a second handle H2, both of which are stored in the volatile memory 20. The handle H2 points to a second master capability MCAP2 which is stored in the reserved area 120-1 of the persistent memory 120. The second master capability MCAP2 provides access rights for a range of memory addresses D2 in the non-reserved area 120-2 of the persistent memory 120. The second data capability DC2 points to the same range of memory addresses D2 as the handle H2. For example, the second data capability DC2 may be a data capability which was sent together with the handle H2 to the processor 10 in response to a request by the processor to allocate the memory addresses D2 to the processor.

FIG. 11 shows two further data capabilities, a third data capability DC2-1 and a fourth data capability DC2-2, which are derived from the second data capability DC2. The third data capability DC2-1 provides access rights for a first subset D2-1 of the range of memory addresses D2, while the fourth data capability DC2-2 provides access rights for a second subset D2-2 of the range of memory addresses D2.

The second data capability DC2, the third data capability DC2-1 and the fourth data capability DC2-2 are all linked to the same handle H2. For example, each data capability may be stored together with a separate copy of the handle H2, as shown in FIG. 11, or a single copy of the handle H2 may be stored in the virtual memory 20 and each of the data capabilities DC2, DC2-1, DC2-2 may be linked to the handle H2 by a tag or otherwise. The handle H2 points to the second master capability MCAP2 which provides access to the range of memory addresses D2 which includes the smaller memory address ranges D2-1 and D2-2.

Thus, it can be seen that applications running on the processor may derive data capabilities that point to smaller ranges of memory addresses within a larger range of memory addresses by copying a data capability and handle that point to the larger range of memory addresses and modifying downwards the scope of the derived data capability so that it points to the smaller range of memory addresses. Thus, many derived data capabilities may rely on the same handle and same master capability.

With this approach, when it is desired to free up the persistent memory, rather than revoking and/or deleting all of the derived capabilities in local memory, instead the master capability in persistent memory may be revoked. For instance, if it is desired to de-allocate the range of memory addresses D2, it is sufficient to revoke the second master capability MCAP2. Then due to the memory access procedures described above, the processor 10 will no longer be able to use any of the data capabilities DC2, DC2-1, DC2-2 to access the persistent memory as they all rely on the handle H2 which points to the revoked master capability MCAP2. This avoids the resource intensive process of keeping a linked list of all of the derived capabilities or scanning for all the derived capabilities. Rather, the derived capabilities can be deleted when they are subsequently used, for example in response to the processor sending a load or read request including a data capability linked to a handle which points to a revoked MCAP. When the memory controller is presented with such a request, the memory controller may generate an exception and in response to the exception the processor may delete the data capability and handle in question.

Figure 12:
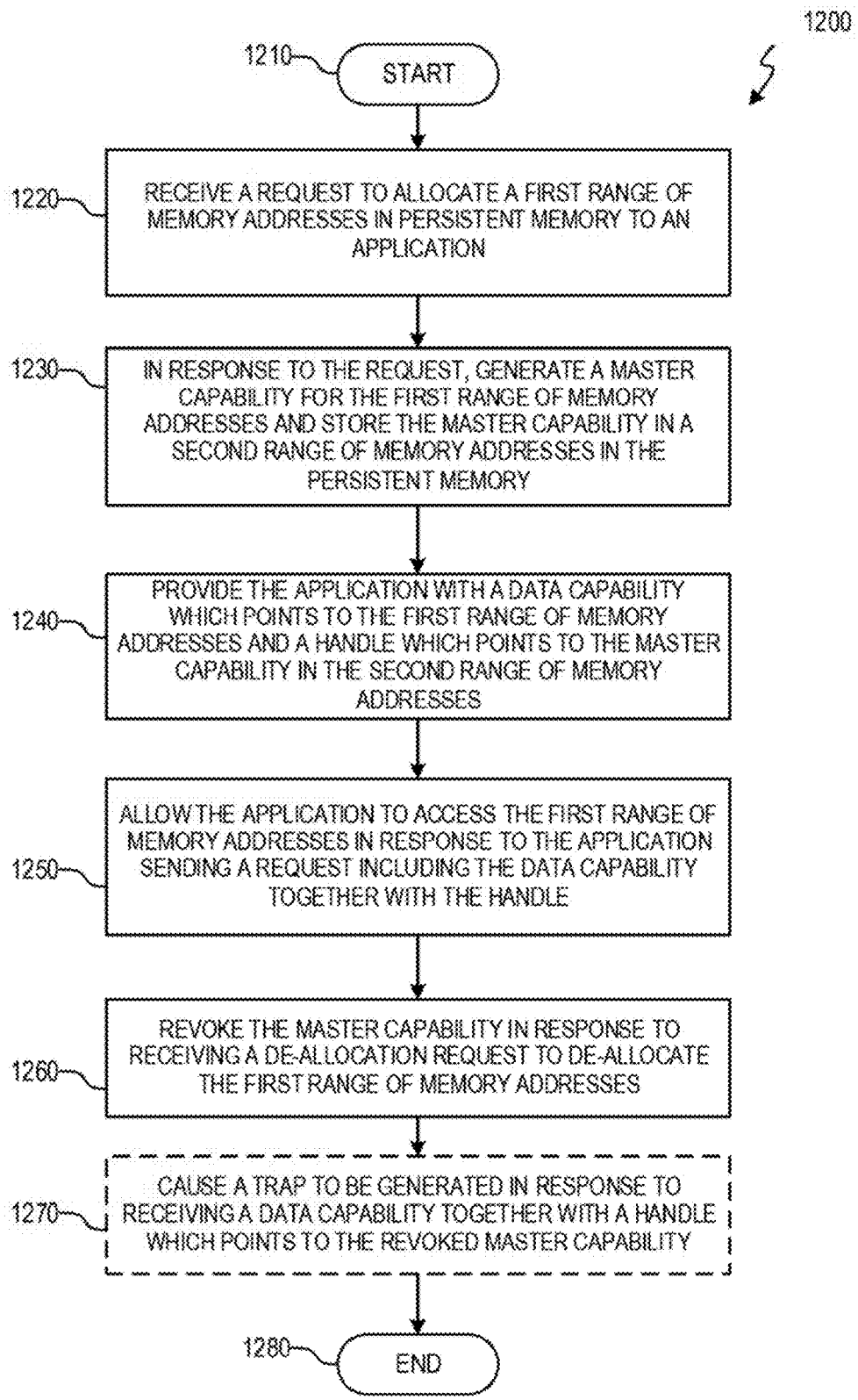
FIG. 12 shows an example method of revoking a master capability according to the present disclosure.

FIG. 12 shows an example method 1200 by which a master capability may be generated and subsequently revoked. The method may be employed by any of the apparatus and systems described above. The method may be implemented by a processor of a node. In some cases the method may be implemented by a memory allocator running on a processor of a node in collaboration with a memory controller accessible by the processor.

The method starts at block 1210.

At block 1220, a request to allocate a first range of memory addresses in persistent memory to an application is received.

At block 1230, in response to said request, a master capability for a first range of memory addresses is generated. The master capability is stored in a second range of memory addresses in the persistent memory.

At block 1240, the application is provided with a data capability which points to the first range of memory addresses and a handle which points to the master capability in the second range of memory addresses.

At block 1250, the application is allowed to access the first range of memory addresses in response to the application sending a request including the data capability together with the handle.

At block 1260, a de-allocation request to de-allocate the first range of memory addresses is received and in response to receiving the de-allocation request, the master capability is revoked.

Further, at block 1270 a trap may be generated in response to receiving a data capability together with a handle which points to the revoked master capability.

At block 1280, the method ends.

Figure 13:
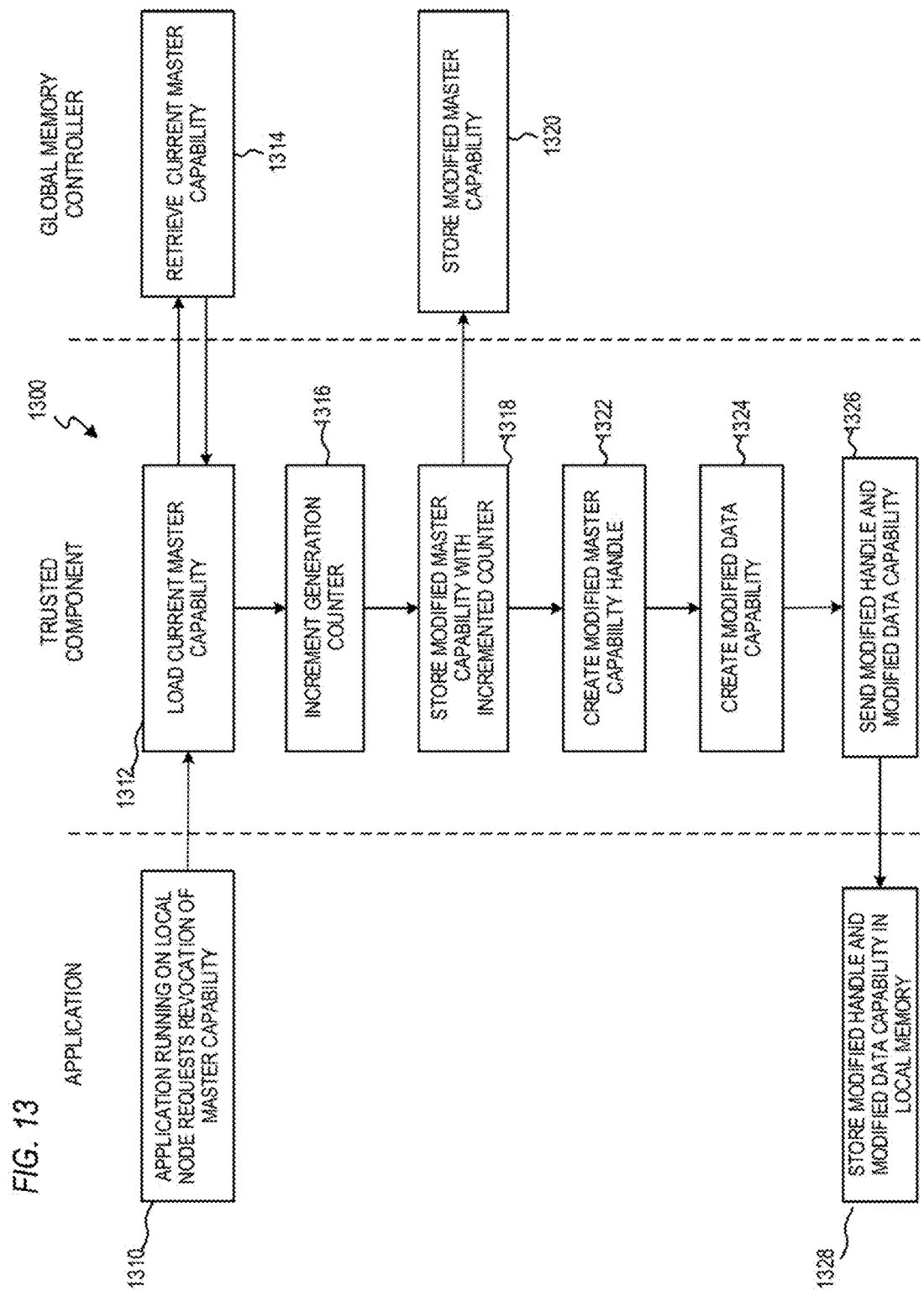
FIG. 13 shows an example method which includes incrementing a generation counter of a master capability.

FIG. 13 shows an example method by which a generation counter of a master capability may be modified in order to revoke access rights to persistent memory by certain nodes. The method may allow one or more nodes to retain access rights by passing such nodes a handle with the new generation counter, while any nodes which possess the old generation counter cannot access the persistent memory.

At block 1310, an application running on a local node requests revocation of a master capability.

At block 1312, a trusted component of the node loads the master capability from persistent memory. This may include sending a request to a memory controller and the memory controller at block 1314 retrieving the master capability (i.e. loading the master capability from persistent memory or a cache).

At block 1316, the trusted component increments the generation counter of the master capability.

At block 1318, the modified master capability with the incremented generation counter is stored in the persistent memory. This may include sending a request to the memory controller and the memory controller at block 1320 storing the modified master capability in persistent memory.

At block 1322, the trusted component creates a modified handle to the master capability. The modified handle may be the same as the previous handle, except that the generation counter is different, for example the generation counter may be incremented.

At block 1324, the trusted component may create a modified data capability. The modified data capability may point to a range of memory addresses within the range of memory addresses which the modified master capability provides access rights for. In one example the range of memory addresses of the data capability may be the same as the master capability.

Further, the trusted component may generate a modified copy of the data capability with a reduced range of memory addresses or a reduced set of permissions and associate the modified copy of the data capability with a copy of the handle to the modified master capability with the incremented generation counter.

At block 1326, the modified handle and modified data capability may be sent to the local node.

At block 1328, the modified handle and modified data capability may be stored in the local memory of the node.

The node may then continue to access the memory addresses pointed to by the data capabilities as they are linked to the modified handle with the new generation counter. However, other nodes which do not have the modified handle may lose access to the memory addresses governed by the master capability as they do not have the modified handle with the incremented generation counter. In response to receiving a data capability together with a handle which points to the revoked master capability with the old generation counter, an invalid capability trap may be generated.

Further, the other nodes cannot forge the handle by incrementing the generation counter, due to the sealing tag, while the handle may be copied, the handle cannot be modified except by the trusted component.

All of the features disclosed in this specification (including any accompanying claims, abstract and drawings), and/or all of the blocks of any method or process so disclosed, may be combined in any combination, except combinations where at least some of such features and/or blocks are mutually exclusive. Furthermore, except where explicitly stated otherwise or where the context or logic demands otherwise, the processes described herein may be carried out in any order and are not limited to the specific order shown in the particular examples. Some of the processes or method blocks described herein may be carried contemporaneously with each other.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example of a generic series of equivalent or similar features.

What is claimed is:

1. A method of accessing persistent memory in a capability based memory system, the method comprising:
    a processor sending a memory access request to a memory controller of the persistent memory, the memory access request including a data capability for a first range of memory addresses and a handle which references a master capability stored in a second range of memory addresses;
    in response to receiving the memory access request, the memory controller checking whether the handle references a valid master capability and checking whether the data capability is within a scope of the master capability; and
    in response to determining that the master capability is valid and the data capability is within the scope of the master capability, the memory controller returning a result of the memory access request to the processor.

2. The method of claim 1, wherein determining that the data capability is within a scope of the master capability includes determining that the first range of memory addresses associated with the data capability is within a third range of memory addresses which the master capability provides access rights for.

3. The method of claim 1, where determining that the handle references a valid master capability includes at least one of the following:
    (i) determining that the master capability includes a valid capability tag; and
    (ii) determining that a generation counter of the master capability is the same as a generation counter of the handle.

4. The method of claim 1, wherein checking whether the handle references a valid master capability includes the memory controller retrieving the master capability from persistent memory or from a cache of the memory controller and comparing the retrieved master capability with the handle.

5. The method of claim 1, wherein the memory access request is a load instruction to load data from the first range of memory addresses and returning the result of the memory access request includes sending data loaded from the first range of memory addresses to the processor.

6. The method of claim 1, wherein the memory access request is a store instruction to store data in the first range of memory addresses and returning the result of the memory access request includes sending confirmation to the processor that data has been stored in the persistent memory.

7. The method of claim 1, wherein in response to receiving the memory access request, the memory controller checks whether the handle references a valid master capability in parallel with retrieving data stored in the first range of memory addresses.

8. The method of claim 1, wherein the memory access request is a request to store data in the first memory address range and wherein the method comprises the memory controller first checking whether the handle references a valid master capability and subsequently storing the data in the first memory address range in response to determining that the handle references a valid master capability.

9. The method of claim 1, wherein the master capability is stored in a reserved area of the persistent memory.

10. The method of claim 1, wherein the handle and the data capability are linked together.

11. The method of claim 1, wherein the handle and the master capability cannot be changed except by a trusted component of the system.

12. The method of claim 1, wherein the master capability includes a pointer to a third range of memory addresses which includes the first range of memory addresses and a permission field indicating at least one permitted operation on the third range of memory addresses.

13. A system comprising:
a first memory to store a data capability for a first range of memory addresses and a handle which references a master capability stored in a second range of memory addresses;
a second memory including said first range of memory addresses and said second range of memory addresses; and
a processor to read the data capability and the handle from the first memory and send a memory access request including the data capability and the handle to a memory controller of the second memory,
wherein the memory controller is to check whether the handle references a valid master capability and check whether the first range of memory addresses of the data capability is included within a third range of addresses which the master capability provides access rights for, and in response to determining that the handle references a valid master capability and that the first range of memory addresses is within the third range of memory addresses, return a result of the memory access request to the processor.

14. The system of claim 13, wherein the system comprises a plurality of local nodes and a global persistent memory which is at least partially shared by the local nodes, the global persistent memory being external to the plurality of local nodes and connected to the local nodes by a network, wherein the processor and the first memory are located on one of the local nodes and the second memory is the global persistent memory.

15. The system of claim 13, wherein the first memory is a volatile memory which is located together with the processor on a first node of the system and the second memory is a persistent memory which is located externally to the first node, the persistent memory being shared by the first node and at least one other node of the system.

16. The system of claim 13, wherein the system includes a plurality of processors which have access to the persistent memory and the master capability is stored in a reserved virtual address space, said reserved virtual address space being mapped to a same physical address space of the persistent memory by each of said plurality of processors.

17. A non-transitory machine readable storage medium storing instructions which are executable by a processing resource to:
receive a request to allocate a first range of memory addresses in persistent memory to an application;
in response to said request, generate a master capability for the first range of memory addresses and store the master capability in a second range of memory addresses in the persistent memory;
provide the application with a data capability which points to the first range of memory addresses and a handle which points to the master capability in the second range of memory addresses;
allow the application to access the first range of memory addresses in response to the application sending a request including the data capability together with the handle;
receive a de-allocation request to de-allocate the first range of memory addresses; and
in response to receiving the de-allocation request, revoke the master capability.

18. The non-transitory machine readable storage medium of claim 17, further including instructions to cause a trap to be generated in response to receiving a data capability together with a handle which points to the revoked master capability.

19. The non-transitory machine readable storage medium of claim 17, wherein the instructions to revoke the master capability include instructions to change a generation counter of the master capability so that the generation counter of the master capability is no longer the same as a generation counter of the handle.

20. The non-transitory machine readable storage medium of claim 17, including instructions to generate a modified copy of the data capability with a reduced range of memory addresses or a reduced set of permissions and associate the modified copy of the data capability with a copy of the handle to the master capability.

* * * * *